United States Patent [19]

Shio

[11] 3,960,229

[45] June 1, 1976

[54] ELECTROMAGNETIC VEHICLE

[76] Inventor: Cheng Shio, 145-34 34th Ave., New York, N.Y. 11354

[22] Filed: Mar. 31, 1975

[21] Appl. No.: 563,724

[52] U.S. Cl. ............................. 180/1 VS; 114/222
[51] Int. Cl.² ................................... B62D 63/02
[58] Field of Search .................. 180/1 VS, 115, 116, 180/119, 9.44; 114/222; 305/35 EB

[56] References Cited

UNITED STATES PATENTS

| | | | |
|---|---|---|---|
| 1,362,518 | 12/1920 | Villiers | 114/222 |
| 3,638,600 | 2/1972 | Moorey | 114/222 |
| 3,777,834 | 12/1973 | Hiraoka | 114/222 |
| 3,781,067 | 12/1973 | Dodson | 305/35 EB |
| 3,810,515 | 5/1974 | Ingro | 180/1 VS |
| 3,811,320 | 5/1974 | Cowell | 114/222 |
| 3,863,393 | 2/1975 | Goff | 114/222 |
| 3,864,876 | 2/1975 | Diehn | 114/222 |

FOREIGN PATENTS OR APPLICATIONS 978,600  12/1964  United Kingdom............... 180/1 VS Primary Examiner—M. H. Wood, Jr.
Assistant Examiner—John A. Carroll
Attorney, Agent, or Firm—Peter L. Berger

[57] ABSTRACT

A motor-driven vehicle movable by a chain belt or similar device, the chain belt carrying a series of electromagnetic pads. The pads, when energized, cause a strong electromagnetic force to be generated enabling the motor-driven vehicle to adhere to an inclined steel surface, such as of a ship. The vehicle may be used for carrying various equipment between points on the inclined surface or on the ship and can be used for staging purposes. The electromagnetic pads or shoes provide a firm and strong gripping means enabling the vehicle to safely move about the ship's surface.

15 Claims, 17 Drawing Figures

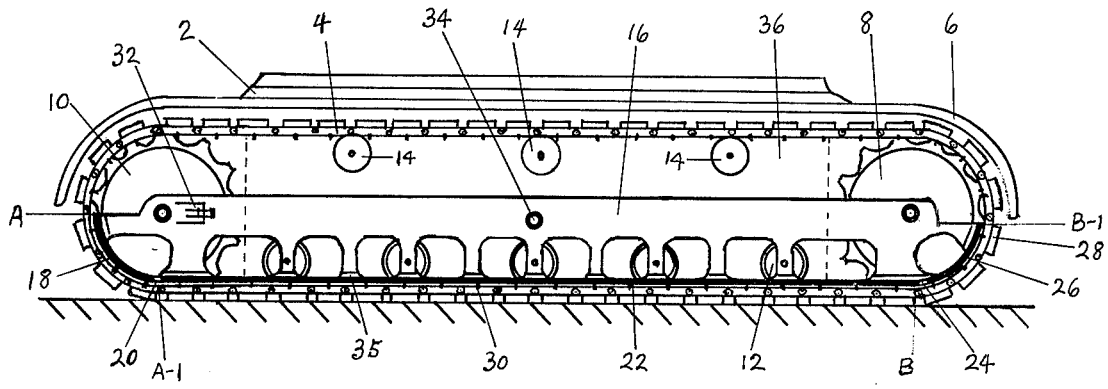
Fig. 1
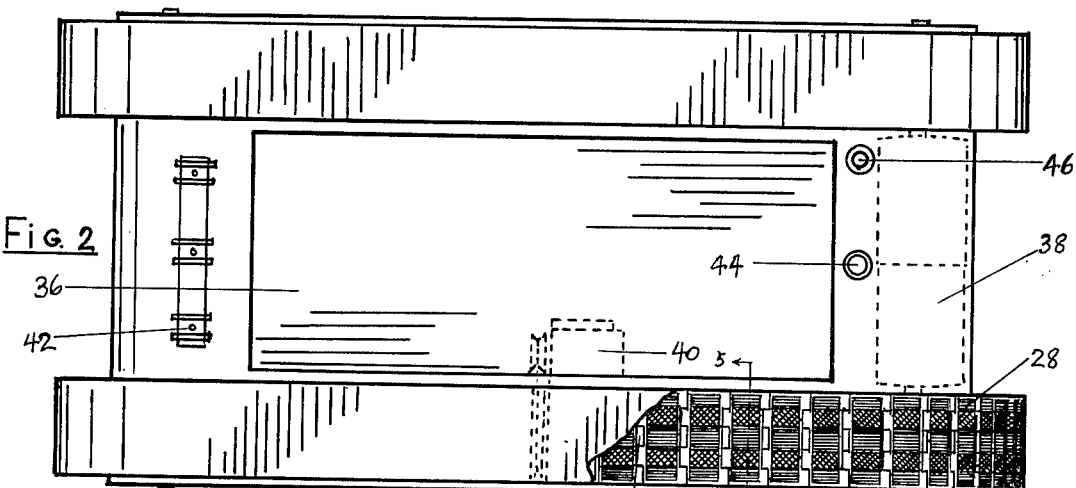
Fig. 2
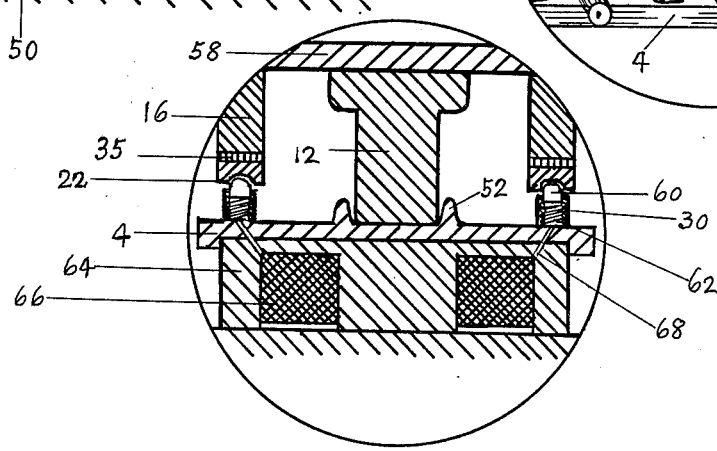
Fig. 3
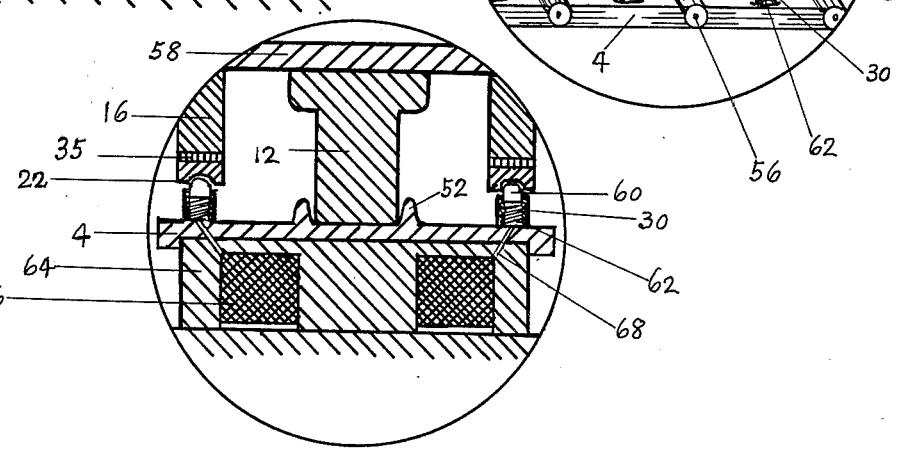
Fig. 4
Fig. 5

ELECTROMAGNETIC VEHICLE

BACKGROUND OF THE INVENTION

This invention relates to a motor-driven vehicle to be used on inclined surfaces, such as ship's, for staging purposes and the like.

Generally, the costs involved in maintenance and other work on a ship are relatively expensive and when materials have to be transported between various places on a ship, relatively complex lifting machinery, such as derricks and cranes are utilized. The inclined and difficult curved surfaces of the ship's hull limit the ability of vehicles to move thereupon and require the above-mentioned complex equipment.

There have been proposed various magnetic systems for enabling a vehicle to move on a sloped surface, these systems including magnetic gripping means enabling the vehicle to be held on these surfaces. Generally, the ability of such prior art devices to adequately perform various functions on a ship is quite limited. These limitations are primarily due to the inability of the prior art devices to generate sufficient magnetic force to hold a heavy-duty vehicle to such surfaces. Further, the ability of the vehicle to move without the magnetic force and the ability for the vehicle to accurately move on such sloped surfaces is quite limited in the prior art.

An object of my invention is to provide a motor-driven vehicle suitable for use on a steel ship's hull, steel storage tank, steel bridge and other steel structures without staging required.

Another object of this invention is to provide such a vehicle which can easily carry and deliver small equipment or tools to any designated point around a large steel ship's hull, side of a large steel storage tank, or any other large steel or iron structure without requiring the use of derricks or cranes.

Another object of this invention is to provide such a vehicle which has sufficient magnetic force generated to enable the vehicle to move and climb on its own power from a pier to an inclined hull of a ship, or from the ground to a steel storage tank wall directly.

Yet another object of my invention is to provide such a vehicle which can be conveniently used for carrying out other functions such as scraping and painting of a ship's hull in a more efficient and simple fashion.

Another object of my invention is to provide such a vehicle which is capable of manuevering when horizontal with or without the electromagnetic force being generated.

Yet another object of my invention is to provide such a vehicle in which the manuevering can take place on an inclined surface with the manuevering being efficient and accurate.

Still another object of my invention is to provide such a vehicle having electromagnetic pads or shoes capable of fitting on any steel surface, whether the surface be flat, angular, grooved or whether concave or convex.

Still another object of my invention is to provide such a vehicle which can quickly and efficiently move between various points on a ship's hull without being dangerous to the vehicle operator.

Still another object of my invention is to provide a safety mechanism to prevent the motor-driven vehicle from falling if there is a failure of the electromagnetic force.

Yet another object of my invention is to provide such a vehicle which can run on lightweight storage batteries.

Another object of my invention is to provide such a machine which can be conveniently manufactured of inexpensive and lightweight materials so as to minimize the weight of the vehicle and therefore minimize the electromagnetic force required.

Other objects, advantages and features of this invention will become more apparent from the following description.

SUMMARY OF THE INVENTION

In accordance with the principles of this invention, the above objects are accomplished by providing a motor-driven vehicle which is moved by a tractor belt, the belt formed of a number of chain links or formed of a continuous natural or synthetic material, such as rubber. Electromagnetic shoes or pads are carried on the tractor belt along both sides of the vehicle and the tractor belt is driven by suitable means, such as an electric or air motor, diesel or gasoline engine. The tractor belts carry the above-mentioned electromagnetic shoes and as the shoes pass along the bottom of the tractor belt, an electromagnetic force can be generated by electrical conductor means in contact with the electromagnetic shoes.

Along the forward, bottom and rear ends of the frame of the vehicle, electrical conducting bars are provided for supplying the electric current which energizes the electromagnetic shoes or pads. Further, only a portion of the conducting bar is energized when the machine is moving in a forward or reverse direction so as to facilitate the movement of the vehicle from a flat horizontal surface toward a curved, inclined surface.

As further described hereinafter, the vehicle is manuevered by use of an AC or DC motor and by moving either or both of the tractor belts on either side of the vehicle together or apart, respectively. For turning, only one of the tractor belts will be moved, while when the vehicle is to move in a straight forward or reverse direction, both belts are moved simultaneously.

Additionally, a safety cable mechanism is provided to prevent the possible accidental falling of the vehicle, if the electromagnetic force is terminated. Thus, a safety locking catch is provided which automatically will lock the vehicle when an electric supply failure is sensed.

BRIEF DESCRIPTION OF THE DRAWING

FIG. 1 is a cut-away side view of an embodiment of my invention showing the vehicle, frame, and tractor belt moved therealong carrying the electromagnetic shoes;

FIG. 2 is a top plan view of the vehicle shown in FIG. 1 with a partial cut-away top plan view of the rear portion of the left-side tractor belt;

FIG. 3 is a partial sectional end view of the vehicle illustrated in FIGS. 1 and 2;

FIG. 4 is an enlarged perspective view of a chain link belt embodiment of the tractor belt of the vehicle illustrated in FIGS. 1–3;

FIG. 5 is an enlarged cross-sectional view taken along lines 5—5 of FIG. 2, lines 5—5 being carried through the bottom of the tractor belt;

DETAILED DESCRIPTION OF THE INVENTION

Figure 6:
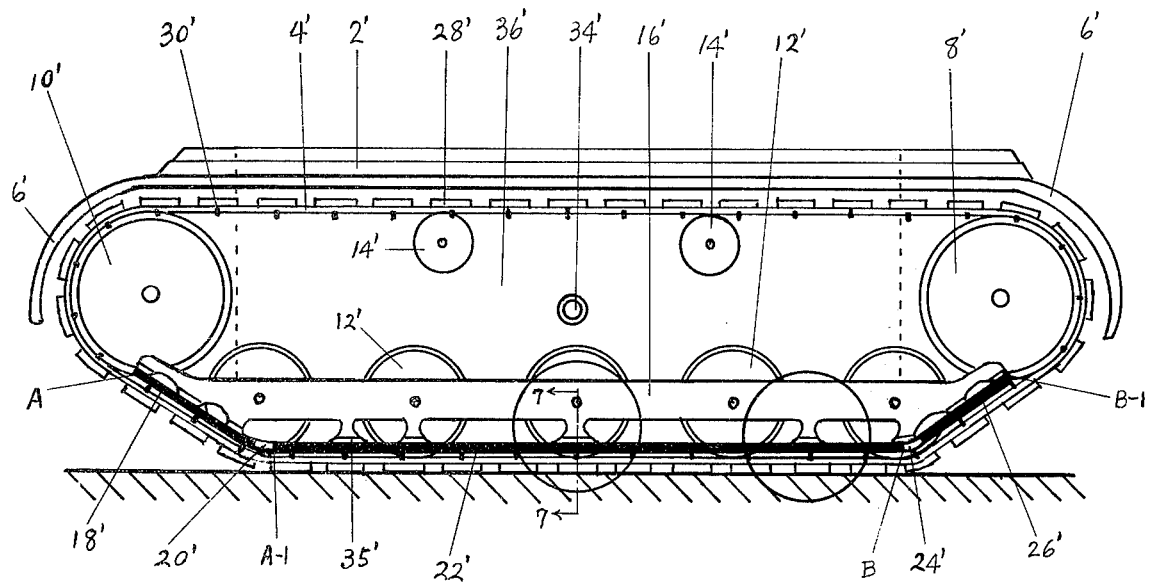
FIG. 6 is a view similar to FIG. 1 showing another embodiment of my invention in which a rubber tractor belt is utilized.

Referring to the figures, and in particular to FIG. 1, there is shown a cut-away side view of an embodiment of my invention which comprises a vehicle having a machine body generally designated by numeral 2. By referring to FIG. 2, a tractor belt 4 is provided on each side of the vehicle, the belts covered by belt guard fenders 6—6. As illustrated in FIGS. 1–5, the belt of my first embodiment is formed of a chain link unit driven by a rear sprocket driving wheel 8 and a front sprocket driving wheel 10 cooperating in the conventional manner. A conventional idle wheel 12 is provided on the bottom for association with the link belt 4, and three upper spaced apart chain link belt support idle wheels 14—14—14 are provided. A wheel frame 16 is provided along the side of the vehicle and is attached between the front and rear portions of the vehicle and is supported on a middle section electrical conducting bar 22 by means of an insulated joint 35.

As indicated above, my vehicle is capable of being moved on sloped or inclined surfaces, such as on the hull of a steel ship and an electromagnetic force is generated for such purposes. Referring to FIG. 1, there is seen along the forward lower portion of the vehicle, a forward electric conducting bar 18, which is separated from a middle section electric conducting bar 22 by a forward insulated connector 20. A rear insulated connector 24 separates the middle section electric conducting bar 22 from a rear section electric conducting bar 26. The conducting bars are formed of copper, brass or other suitable electrically conducting metals. Further, conducting bars 18, 22 and 26 approximately follow the shape of the lower portion of the vehicle.

Numeral 28 generally designates the electromagnetic shoe unit or pad. Referring to FIG. 4, there is an enlarged perspective view of the chain link belt 4 in which center conducting bar 22 is illustrated. One shoe construction is shown, although other shoe constructions are similar. An electromagnetic shoe terminal spring contact unit 30 electrically contacts the middle section electric conducting bar, and the contact unit 30 moves sequentially along the forward, middle and rear conducting bars for receiving electricity to energize the electromagnetic shoes 28. Referring to FIG. 5 in conjunction with FIG. 4, there is shown the electromagnetic shoe terminal spring contact unit 30 and a tension spring 62 associated therewith for carrying current carried by conductor 22 through a copperized carbon brush contact 60 to an electromagnetic coil 66 by means of an insulated electrical connector 68. The electromagnetic coil 66, made of enamel or other suitable copper coated wire, causes an electromagnetic force to be generated in an iron core 64 which surrounds the electromagnetic coil 66. The iron core may be formed of soft iron, ferric alloys or compounds which will not become permanently magnetized when electric current actuates the magnetic force therein.

Referring again to FIG. 1, there is shown a front wheel tension adjusting screw 32 connected to the front wheel for suitable adjusting purposes. Further, referring to FIGS. 1–3, there is shown a hole or aperture 34 through which a safety cable 88 (to be discussed hereinafter) passes. The safety cable is attached to a tension winch 40, which is secured to the vehicle chassis 2.

A compartment 36 is formed in the rear part of the vehicle and is used for attaching such auxiliary pieces of equipment as electric or pneumatic chipping hammer and wire brushing units. There is also provided a foundation 42 which is attached to the frame or chassis 2 in the front portion of the vehicle, the foundation serving as a holder for paint-spraying and sand-blasting nozzles and for other similar apparatus. Additionally, there is provided a socket 44 for suitable electrical connection, the socket being formed on the upper portion of the frame 2 of the vehicle. A terminal 46 is also provided on the frame of the vehicle (see FIG. 2) for remote control cables and suitable other similar devices.

The belt 4 is driven by a suitable motor, such as an electric driving motor coupled thereto by conventional means, such as shafts, universal joints, clutches, couplings, gears, V-belts, all generally designated by numeral 38. Other motors may be used for the vehicle of my invention, such as an air, diesel or gasoline type.

The embodiment illustrated in FIGS. 1–5 comprises the belt 4, which is formed of a plurality of chain links, as will be discussed in more detail by referring to FIGS. 4 and 5.

Hinge type joints 54 are provided on each side of the chain link unit 4 and are connected by chain link joint self-locking pins 56. An open space 48 is formed in the middle portion of the hinge joint 54 in which sprocket teeth of the driving wheels 8 and 10 (FIG. 1) are engaged therewith for driving the chain link belt 4. The chain link unit 4 is made of a lightweight metal, such as aluminum, aluminum alloys or strengthened lightweight plastic materials, which are not responsive to or affected by the magnetic force generated by the electromagnetic shoes 28.

The electromagnetic shoe unit 28 is formed on one side face of the chain link unit 4 as seen in FIG. 3 and is attached thereto by suitable rivet, screws or other connecting means. On the other side face of the chain link unit, wheel guard cleats 52 are provided at the middle section thereof to serve as a track guard in order to ensure that the driving wheel 8 or 10, idle wheels 12 and 14, always travel in the center of the belt. The wheel guard cleats 52 also serve to prevent the chain link belt from slipping sideways out from the wheel.

The operation of the vehicle illustrated in FIGS. 1 through 5 will now be explained.

A strong electromagnetic force is generated when the terminal contact unit 30 of each of the electromagnetic shoes travels along the electric conducting bars 18, 22 and 26 between points A and B-1 (see FIG. 1) along the lower edge of the vehicle. The electromagnetic force on the shoes between points A and B is constant and terminates when the terminal contact unit 30 passes the end of the insulated connector 20 or 24, depending upon the direction the vehicle is travelling in. Thus, when the vehicle is travelling in the forward direction, that is the belt is moving from point A to B, there is no electric current applied to the rear conducting bar 26 and when the electromagnetic shoe terminal spring contact unit 30 passes insulated connector 24, the electromagnetic shoe 28 housing said contact unit 30 becomes deenergized. When the vehicle travels in the reverse direction, then the forward conducting bar 18 is without electricity and electricity is applied between the points A1–B1 along the bottom of the vehicle. Thus, front conducting bar 18 receives no electricity. As the contact unit 30 of each electromagnetic shoe 28 moves past point A1, the electromagnetic energization disappears, and no more magnetic force is carried therein. The controlling of whether the forward conducting bar 18 or the rear conducting bar 26 is energized is done under the direction of a suitable conventional control switch which is responsive to the directional movement of the vehicle.

Insulated connectors 20 and 24 are provided with the same thickness and smooth surfaces as the electric conducting bars they connect, which enables the terminal contact units 30 to move from one section to an adjacent section without difficulty.

By alternately energizing the front or rear conducting bars 18 or 26 respectively, the conventional drag force is eliminated. Conventionally, the magnetic drag force exists on the rear section of the tractor belt under the driving wheel when the vehicle is moving forwardly and under the forward section of the front wheel when the vehicle is moving reversely. The arrangement for alternately energizing the front or rear conducting bars 18 or 26 eliminates this drag.

The vehicle, as described above, is capable of moving forwardly or reversely as desired. In order to control the turning of the vehicle, each of the belts 4 is capable of being separately energized. Thus, the steering of the vehicle can be achieved by either applying a braking force to one or another of the tractors, or by energizing one or the other of the belts without allowing the other to be energized. By applying electric current to the right side of the vehicle, the tractor belt located therein will cause the vehicle to turn rightwardly because the left driving wheel is still moving forward and the vehicle is being pivoted on the right side. The speed of the vehicle can be controlled by means of suitable rheostats, tapped transformers or other electro-mechanical means. The control of the vehicle can be directed with an operator riding thereupon or can be remotely controlled by means of wire cables or radio control.

In order to further eliminate and reduce the weight of the vehicle, its body and structure can be made of a frame skeleton form of light but strong non-ferric materials. In order to increase the magnetic adhesive ability, the size and surface of the electromagnetic shoe 28 can be increased. Further, the surface and design of the electromagnetic shoe 28 can be made in different forms or shapes to suit specific purposes to operate on either flat, angular, grooved, concave or convex surfaces.

Figure 7:
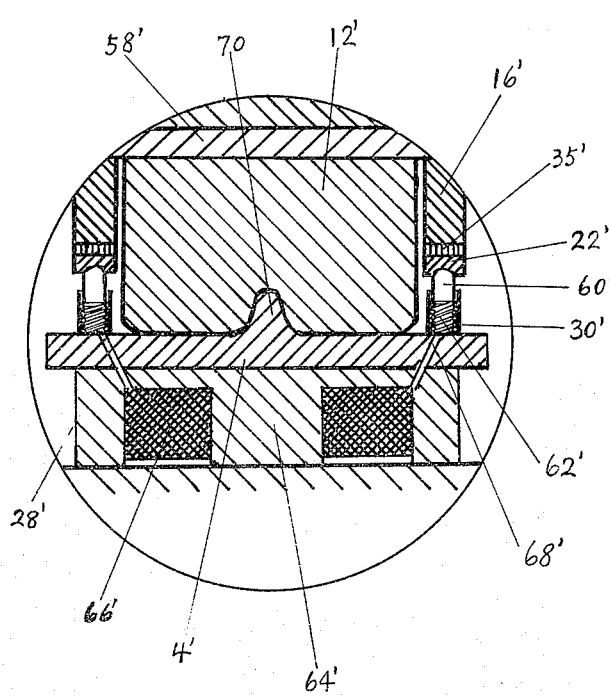
FIG. 7 is another enlarged cross-sectional view taken along lines 7—7 of FIG. 6 showing the tractor belt and electromagnetic shoe.
Figure 8:
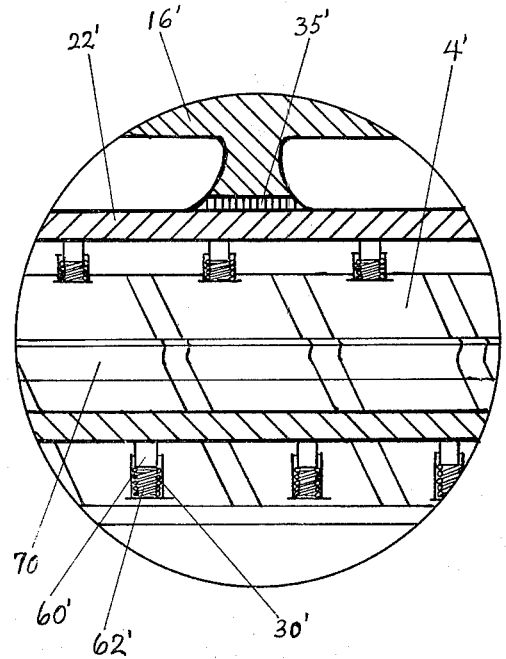
FIG. 8 is an enlarged perspective view of the rubber tractor belt illustrated with the vehicle of FIG. 6.

Another embodiment of my invention is illustrated in FIGS. 6 through 8. In those figures, primed numerals are used to designate the same parts as the unprimed numerals of FIGS. 1 through 5. There are some differences between my embodiments, and the principal one relates to the construction of the belt. In the embodiment illustrated in FIGS. 6–8, the belt 4' is formed of a natural or synthetic rubber and is provided with a center line shoulder 70 on the inner face of the tractor belt which will be in contact with the front and rear driving wheels 10' and 8' respectively, the bottom idle wheels 12' respectively, and the upper belt support idle wheels 14'. Each of these wheels is provided with a groove in the middle of the wheel face deep enough so as to seat the shoulder 70 in order to ensure that the belt does not slip sideways while moving. Both the inner face of the tractor belt and all the facing wheels thereof are provided with ripples in order to increase the traction efficiency.

No further discussion will be provided for the embodiments of FIGS. 6 through 8, since the vehicle illustrated therein operates in the same manner as that of FIGS. 1–5.

Figure 9:
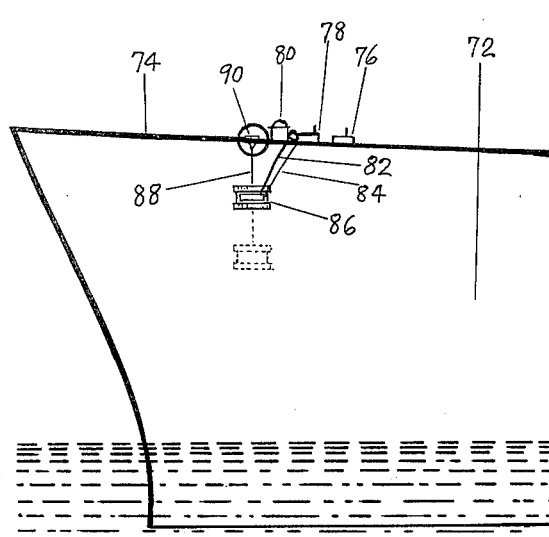
FIG. 9 is a side view of an illustration of the use of the vehicle forming my invention with the vehicle moving from one position to another position, as represented by a dotted line on the hull of a ship.
Figure 10:
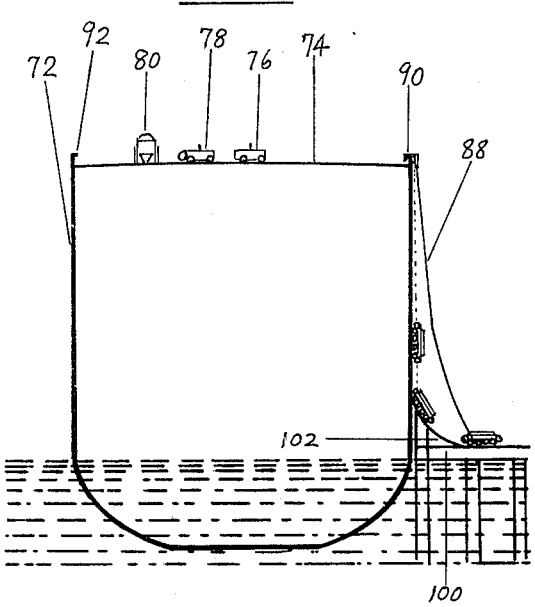
FIG. 10 is another view illustrating further applications of my invention.
Figure 11:
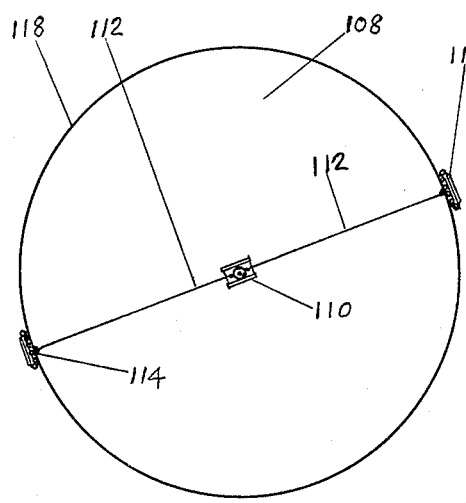
FIG. 11 is a top plan view of a steel storage tank top showing two of my vehicles working on opposite sides of the tank wall with another vehicle stationed at the center of the tank.
Figure 12:
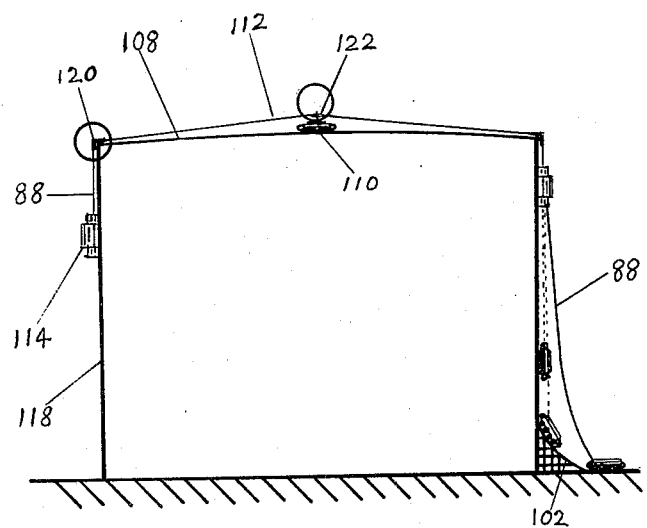
FIG. 12 is a side view of the application illustrated in FIG. 11 further showing one vehicle directly climbing from the ground to the wall of a steel storage tank.
Figure 13:
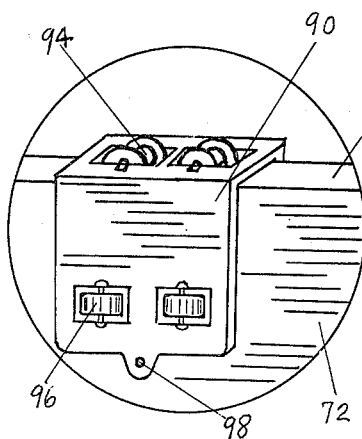
FIG. 13 is an enlarged perspective view of a steadment bearing post and wheel assembly.

FIGS. 9 through 15 are various schematic illustrations of the use of my vehicle. Referring to FIGS. 9 and 10, there is shown a side and front view of a boat having a steel hull 72 and a main deck 74. During use around a pier 100, the vehicle can be used to carry various small equipment and tools to any designated point around the hull 72 of the ship without staging or the use of derrick or crane equipment. In FIG. 9, numeral 76 designates a diesel generator while numeral 78 designates a diesel driven air compressor which are conventional types of equipment found for use around a pier and on a ship's surface. For painting and other purposes such as sanding, a storage tank such as 80 is carried on the deck 74 of the ship and a hose such as 82 is attached to the tank 80 so as to enable paint spraying to be accomplished. For purposes of illustration, an electrical cable 84 is illustrated between the diesel driven air compressor 78 for supplying power to my vehicle 86. The vehicle is capable of moving along the vertical surface 72 when the electromagnetic shoes, as described above, are energized and the tractor belt is driven. For purposes of safety, the aforedescribed safety cable 88, one end of which is secured to the above-described tension winch 40 (FIG. 2) while the other end of the cable 88 is secured to a special type of angle dolly 90 secured to the bulwark 92 (FIG. 13) of the ship. When the vehicle moves by electric motor power, the tension winch 40 is also operated and includes a gear and cooperating safety lock catch which enables the cable to be unwound off the tension winch. When there is a failure of electrical supply, the safety locking catch will automatically lock the tension gear which locks the winch to prevent further cable from being unreeled and locks the vehicle in position. After electric power is reactivated, the safety catch will be released and more safety cable can be unwound from the tension winch. Referring more particularly to FIG. 13, there is shown in further detail the angle dolly 90 which is for shipboard use on the bulwark 92. For purposes of ease of movement, there is provided on the bulwark facing surface, a wide faced dolly wheel 94 while along the hull 72 of the boat there is provided in the angle dolly 90 a wide faced dolly wheel 96. A connecting pad eye 98 for the safety cable is also attached to the angle dolly 90. In this manner, the angle dolly can be moved along the bulwark of the ship ensuring that the safety cable cooperating therewith is securely fastened to the vehicle as it moves along the ship's side surfaces for purposes of safety, as described above.

My vehicle, with its powerful magnetic adhesive force generated on the electromagnetic shoes, is capable of moving and climbing on its own power from a pier 100 (FIG. 10) up a curved steel ramp 102 to the hull 72.

The vehicle has the aforementioned storage compartments 36, 36', and holder 42, etc., for various storage purposes and is capable of being operated with various attachments such as scraping blades, chipping hammers, wire brush units, sand blasting nozzles or paint spraying nozzles for scraping, chipping, wire brushing, sand blasting and paint spraying the ship's hull. By using a large number of my vehicles any sizeable work can be accomplished within a reasonably short period of time involving less labor than presently obtainable. The machine can work around the clock without the costly staging requirements presently utilized. Further, the machine can be used for carrying and delivering small equipment and machine tools to any point around the ship, especially on the inclined or sloped surfaces thereof.

Figure 15:
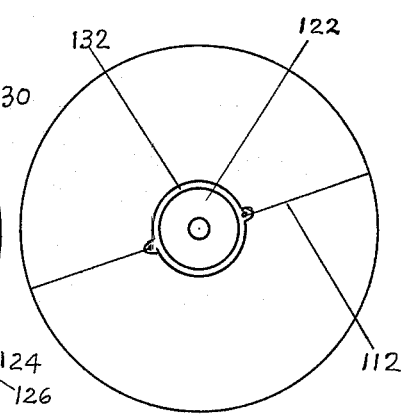
FIG. 15 is another top view illustrating the use of the center post steadment bearing wheel assembly.

Referring to FIGS. 11, 12 and 15, there is shown yet another use for my vehicle. My vehicle can operate on top 108 of a large steel tank and also on its side surfaces because of the electromagnetic force generated when the electromagnetic shoes are energized. Thus, referring to FIG. 11, there is shown a circular top 108 which could be that of a steel storage tank or other steel or iron structure on which one of my vehicles 110 is located in the center thereof. Each of my vehicles is provided with a suitable remote control cable connecting terminal such as 46 in FIG. 2, and cables 112 are connected between the centrally located vehicle 110 and remotely located vehicles 114 and 116 respectively. Vehicles 114 and 116 are provided with the electromagnetic shoes of my invention and are able to move along the curved surface of the steel structure, as described above. Each of the vehicles is capable of moving upwardly, downwardly or in any direction on the curved outer surface 118 of the steel structure 108.

Figure 14:
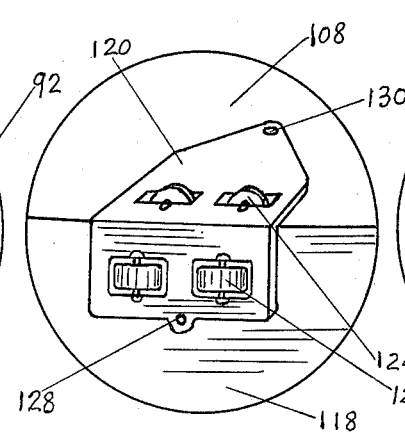
FIG. 14 is an enlarged perspective view of an angle dolly which can be pulled freely along the edge of the tank top of both vehicles working at the same speed and in the same direction.

Referring to FIGS. 12 and 14, there is shown yet another special angle dolly 120 for use with structure 108. The vehicle 110 located at the center of the tank 108 is provided with a center post steadment bearing wheel 122 which allows the vehicles to move around the side curved surface 118 of the structure 108. The angle dolly 120 is provided with angle dolly rollers 124 and 126 movable along the top and side edges, respectively, of the structure, and the dolly is also provided with a safety cable connecting pad eye 128. Additionally, a pad eye 130 is provided as part of the angle dolly for connection to the cable 112 between the center vehicle center post steadment bearing wheel 122 and respective angle dolly 120.

Referring to FIG. 15, there is shown in further detail the center steadment post 122 and a cooperating control bearing wheel 132. The illustrated embodiments in FIGS. 11, 12, 14 and 15 allow the vehicle 110 to serve as a stationary centerpoint with its electromagnetic shoes being energized. Two similar vehicles working at opposite sides of the tanks are connected to the center stationary vehicle and can be moved horizontally in the same direction, either clockwise or counterclockwise. The safety cable of one vehicle is secured to the angle dolly 120 and the angle dolly also connects to one side of the center wheel 132 by means of the above-described connecting pad eye 130. Thus, the two vehicles, while working, can balance each other which further serves to enhance the safety of a system employing my vehicles.

Figure 16:
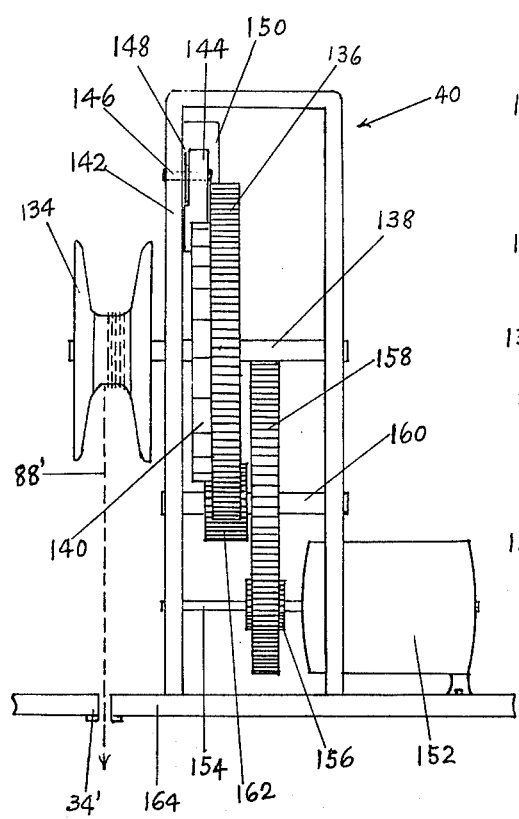
FIG. 16 is a cut away side view of an embodiment of a tension winch for use with my invention.
Figure 17:
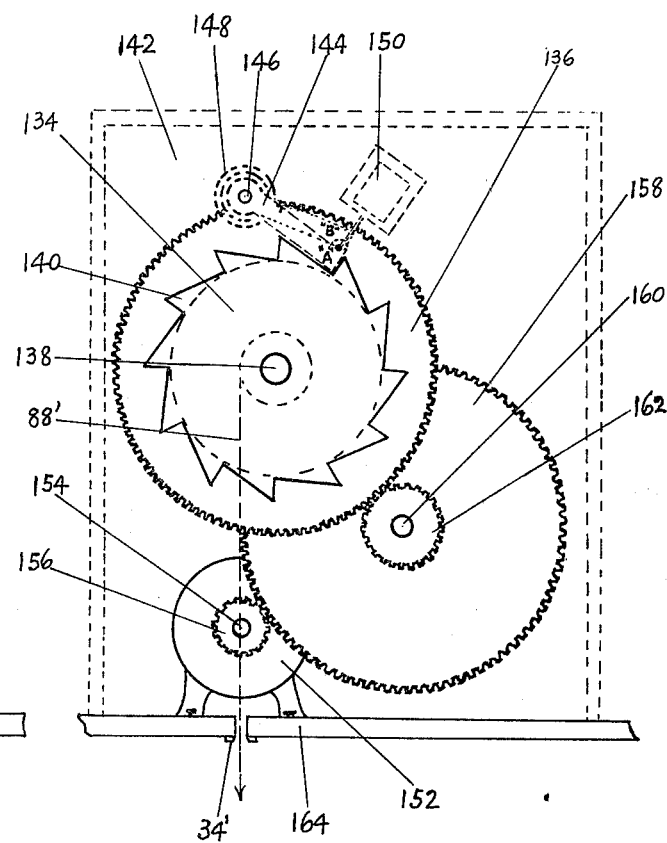
FIG. 17 is a cut away front view of the tension winch shown in FIG. 16.

Now referring to FIGS. 16 and 17, there are shown details of the tension winch 40. A safety cable drum 134 is mounted on a second reduction gear shaft 138. A sprocket locking gear 140 is attached to the second reduction gear 136 and both are mounted on the second reduction gear shaft 138 on other side of the front gear casing 142. On the inner face of the front gear casing 142, a lock catch 144 is secured by a strong riveted pin 146 which is pushed toward the sprocket lock gear 140 by a winding spring 148 to serve as a lock, as shown in position A to prevent the sprocket locking gear from turning counter-clockwise, thus automatically locking the safety cable drum 134.

There is a solenoid 150 mounted on the inner face of the front gear casing 142 which is connected to the free end of lock catch 144 which will overcome the winding spring force and pull the lock catch 134 away from the sprocket locking gear 140 to the position B when electric current is connected.

The second reduction gear 136 is driven by a motor 152 by means of a motor shaft 154, a first driving gear 156, a first reduction gear 158, a first reduction gear shaft 160 and a second driving gear 162. The safety cable 88' can be unreeled freely from the safety cable drum 134 through the safety cable hole 34' of the vehicle's compartment wall 164, because of very little resistance from the idle gears and the motor when solenoid 150 pulls lock catch away from the sprocket locking gear 140 under application of electric current. When there is an electric supply failure, no electric current is supplied to the solenoid, and the lock catch 144 will spring back immediately to the sprocket locking gear 140 and automatically lock the second reduction gear and safety cable drum which will prevent further cable from being unreeled and thus, lock the vehicle in position. After electric power is restored, the solenoid 150 functions again, and the lock catch will be released and more safety cable can be unwound from the safety cable drum of tension winch. When necessary to rewind the safety cable, a switch on the motor 152 can be activated only driving the second reduction gear in a clockwise rotation. For extra safety during such operation, the current to the solenoid is switched off and the sprocket gear is locked to prevent possible counterclockwise motion.

It will thus be seen that the objects set forth above, among those made apparent from the preceding description, are efficiently attained, and since certain changes may be made in the above apparatus without departing from the scope of this invention, it is intended that all matter contained in the above description and shown in the accompanying drawings shall be interpreted as illustrative and not in a limiting sense.

What is claimed is:

1. A movable vehicle adapted to move on inclined steel surfaces, such as the hull of a ship, said vehicle comprising a frame, a pair of belts with each belt located on a respective side of said frame and forming a loop, said loop extending substantially the length of said vehicle, motor means for driving said belts, said belts comprising cooperating means for engaging said motor means to be driven thereby, each of said belts comprising a plurality of electromagnetic shoes attached to the outer face of said belts, each of said electromagnetic shoes comprising a wire wound core adapted to provide a magnetic force when energized to enable said vehicle to adhere to said surfaces, electrical conductor means attached to the bottom portion of said vehicle for delivering electrical current, each of said elecromagnetic shoes comprising electrical contact means for contacting said electrical conductor means and carrying electrical current to said electromagnetic shoe as said shoe passes along the bottom of said vehicle.

2. A movable vehicle as in claim 1, wherein said electrical conductor means comprises a front conductor, a middle conductor and a rear conductor connected by insulators, means for energizing said front and middle conductors only when said vehicle travels forwardly and said middle and rear conductors when said vehicle travels in a reverse direction.

3. A movable vehicle as in claim 2, wherein said front and rear conductors extend from the bottom of said vehicle in a curvilinear fashion forwardly and rearwardly upwardly, respectively, approximately paralleling the contour of the frame of said vehicle.

4. A movable vehicle as in claim 1, wherein said contact means of said electromagnetic shoe comprises a brush contact housed within a spring means, said spring means urging said brush contact into contact with electrical conductor means while said shoe moves along said conductor means.

5. A movable vehicle as in claim 1, wherein said electromagnetic shoes are equally spaced from each other on said belt.

6. A movable vehicle as in claim 1, wherein each of said belts comprises means to prevent said belts from slipping sidewise as said belts are driven.

7. A movable vehicle as in claim 6, wherein said belts comprise a plurality of chain link units connected together to form said loop, said chain link units being formed of a non-magnetizable material.

8. A movable vehicle as in claim 1 comprising driving wheels connected to said motor means, said driving wheels having sprocket teeth, wherein each of said chain link units is connected to the next chain link unit to form an opening therebetween for cooperatively receiving said sprocket teeth enable said belt to be driven by said driving wheels.

9. A movable vehicle as in claim 8, wherein said belts comprise wheel guard cleats attached to and projecting from the inner surface of said belts, said wheel guard cleats cooperatively engaging said openings to prevent said belts from slipping sideways.

10. A movable vehicle as in claim 1, wherein said belts comprises an endless loop of a continuous material.

11. A movable vehicle as in claim 10, wherein said belts comprises an endless loop formed of a rubber material.

12. A movable vehicle as in claim 11, wherein the inner surface of said belts comprises means to prevent said belts from slipping sideways as said belts are driven.

13. A movable vehicle as in claim 12, wherein said means to prevent slipping comprises a ridge projecting from said inner surface for engagement with drive means which drive said belts.

14. A movable vehicle as in claim 1, comprising safety cable means attached between a fixed point related to said steel surfaces and said vehicle, said safety cable means preventing said vehicle from falling if the electrical power causing said electromagnetic shoes to be energized is interrupted.

15. A movable vehicle as in claim 14, comprising safety catch means associated with said safety cable for locking said safety cable.

* * * * *